United States Patent
Sasse

(10) Patent No.: US 6,929,105 B2
(45) Date of Patent: Aug. 16, 2005

(54) FULLY FILLED WET CLUTCH WITH HYDRODYNAMIC COOLING

(75) Inventor: Christoph Sasse, Schweinfurt (DE)

(73) Assignee: Zf Sachs AG, Schweinfurt (DE)

( * ) Notice: Subject to any disclaimer, the term of this patent is extended or adjusted under 35 U.S.C. 154(b) by 0 days.

(21) Appl. No.: 10/467,580

(22) PCT Filed: Dec. 1, 2001

(86) PCT No.: PCT/EP01/14061
§ 371 (c)(1),
(2), (4) Date: Aug. 8, 2003

(87) PCT Pub. No.: WO02/068837
PCT Pub. Date: Sep. 6, 2002

(65) Prior Publication Data
US 2004/0074728 A1 Apr. 22, 2004

(30) Foreign Application Priority Data
Feb. 28, 2001 (DE) .......................................... 101 09 497

(51) Int. Cl.[7] ............................................. F16D 13/72
(52) U.S. Cl. ................................. 192/70.12; 192/113.3
(58) Field of Search ........................... 192/70.12, 70.2, 192/112, 113.3, 113.34

(56) References Cited

U.S. PATENT DOCUMENTS

| 1,742,804 A | | 1/1930 | Carhart |
| 3,695,407 A | | 10/1972 | Peery |
| 3,907,073 A | * | 9/1975 | Harrison ..................... 188/71.2 |
| 4,140,198 A | * | 2/1979 | Chamberlain ............... 180/370 |
| 4,560,048 A | | 12/1985 | Flotow et al. |
| 4,693,350 A | * | 9/1987 | Sommer ................... 192/18 A |
| 5,813,508 A | * | 9/1998 | Shoji et al. ............ 192/113.34 |
| 6,142,280 A | | 11/2000 | Koike |

FOREIGN PATENT DOCUMENTS

FR 2 792 692 A 10/2000

* cited by examiner

Primary Examiner—Saul Rodriguez
(74) Attorney, Agent, or Firm—Cohen, Pontani, Lieberman & Pavane

(57) ABSTRACT

A fluid clutch includes a housing having an interior that can be filled with fluid, an output element that can be rotated relative to the housing, a first friction surface arrangement coupled to the housing, a second friction surface arrangement coupled to the output element, and means for bringing the first and second friction surface arrangements into frictional engagement. A fluid circulation arrangement in the housing causes fluid to circulate around the friction surfaces without requiring a simultaneous exchange of fluid to and from the interior.

11 Claims, 2 Drawing Sheets

FULLY FILLED WET CLUTCH WITH HYDRODYNAMIC COOLING

PRIORITY CLAIM

This is a U.S. national stage of application No. PCT/EP01/14061, filed on 01 Dec. 2001. Priority is claimed on that application and on the following application: Country: Germany, Application No.: 101 09 497.3, Filed: 28 Feb. 2001.

BACKGROUND OF THE INVENTION

1. Field of the Invention

The present invention relates to a clutch arrangement, in particular for a motor vehicle.

2. Description of the Related Art

U.S. Pat. Nos. 6,394,243 and 6,142,180 disclose "wet clutch arrangements" in which various friction surface arrangements are contained in a fluid-filled working space and can be brought into mutual frictional contact by means of a clutch piston, in order to produce a torque transmission connection between a housing arrangement, which is generally coupled to a driving assembly, and an output shaft, i.e. for example, a transmission input shaft. Wet clutch arrangements of this type are used particularly in very heavily stressed regions, since they are able to remove the frictional heat produced in the region of the friction surface arrangements, in particular in the slip mode, i.e., for example, when starting up, by means of the supply and removal of fluid. However, especially when starting up with severe slip in the clutch, i.e., for example, when starting up on a hill, wet clutches of this type are often no longer capable of removing to a sufficient extent the heat produced in the region of the friction surface arrangements bearing frictionally against one another, it thus being possible, at least in local regions, for thermal overloading to occur. This problem is especially also becoming increasingly greater, since modem motor vehicles are increasingly using driving assemblies, for example turbo diesel assemblies with a common rail system, which, even at a low speed of rotation, can output a very large torque which, when a clutch is engaged, is initially converted completely into friction work and therefore heat.

SUMMARY OF THE INVENTION

The object of the present invention is to provide a wet clutch arrangement, in particular for a motor vehicle, in which the risk of at least local overheating can be eliminated to the greatest possible extent, even at severe loading.

This object is achieved according to the invention by a clutch arrangement in particular for a motor vehicle, comprising: a housing arrangement which is filled or can be filled with fluid, a first friction surface arrangement and a second friction surface arrangement in the housing arrangement, which can be brought up to rest against each other in order to produce a frictional interaction, it being possible for a fluid flow to be produced in the housing arrangement to cool the friction surface arrangements.

This clutch arrangement is characterized by a fluid circulation arrangement which is provided in the housing arrangement to cause the fluid to circulate around at least some areas of the first friction surface arrangement and the second friction surface arrangement.

Whereas in the wet clutch arrangements known from the prior art heat is removed via the fluid, which flows around the friction surface arrangements, in such a manner that a fluid exchange flow is built up which causes fluid to be continuously introduced into the interior of the housing arrangement and heated fluid to be removed, according to the principles of the present invention a circulation of fluid is built up in the housing arrangement which does not necessarily also require a fluid exchange flow at the same time. The fluid circulating in the circulation in the housing arrangement flows around the friction surface arrangements and can therefore contribute to a significantly better removal of heat. The present invention makes particular use of the fact that fluids of this type have a comparatively large heat storage capacity which is a long way from being exhausted after the fluid has flowed once past the friction surface arrangements. On the contrary, in the case of the clutch arrangement constructed in accordance with the principles of the present invention, the fluid flows repeatedly or a number of times around the friction surface arrangements before it is drawn off from the housing arrangement again in the context of the fluid exchange, which is optionally present in parallel. Therefore, when a pump of comparatively small size is used, by means of which the fluid is fed into the housing arrangement and is drawn off therefrom, a significantly improved removal of the thermal energy from the friction surface arrangements can be obtained by one and the same fluid flowing a number of times around said arrangements before it is exchanged. Of course, in the case of the circulation which is built up according to the invention within the housing arrangement, continuous mixing of the circulating fluid with fluid which has been newly introduced into the housing arrangement and is therefore still relatively cold can take place.

According to one particularly preferred aspect of the present invention, provision may be made for the first friction surface arrangement to be coupled to the housing arrangement for rotation together, for the second friction surface arrangement to be coupled to an output element for rotation together, and for the fluid circulation arrangement to have a first conveying element, which can be rotated with the housing arrangement, and a second conveying element, which can be rotated with the output element. For example, it is possible for the first conveying element to be designed as a ring-like, first blade wheel which surrounds an axis of rotation, and for the second conveying element to be designed as a ring-like, second blade wheel which surrounds the axis of rotation. In this case, each of the blade wheels can comprise a blade wheel shell which supports a plurality of conveying blades, which follow one another in the circumferential direction, and is opened toward the other blade wheel in each case. A construction can ultimately be provided here which corresponds in respect of the principle of fluid circulation to a "fluid clutch", in which a circulation is built up between a first conveying element, i.e. for example, a pump impeller, and a second conveying element, i.e., for example, a turbine wheel, i.e. ultimately a taurus-shaped circulation which surrounds an axis of rotation is produced.

In order to be able to keep the overall size as small as possible and in order to be able to configure the cooling effect introduced by the circulation of fluid as efficient as possible in the clutch arrangement according to the invention, it is proposed that the first blade wheel or/and the second blade wheel has a radially outer blade wheel region and a radially inner blade wheel region, and in that the first friction surface arrangement and the second friction surface arrangement are at least partially arranged in a region radially between the radially outer blade wheel region and the radially inner blade wheel region.

Furthermore, the construction of the clutch arrangement according to the invention can be kept very simple if it is provided that each friction surface arrangement has at least one friction element, and that the at least one friction element of the first friction surface arrangement is coupled by means of the first friction element to the housing arrangement for rotation together, or/and that the at least one friction element of the second friction surface arrangement is coupled by means of the second friction element to the output element for rotation together. Provision may be made here, for example, for the at least one friction element of the first friction surface arrangement or/and the at least one friction element of the second friction surface arrangement to be coupled to at least one part of the conveying blades of the first conveying element and/or of the second conveying element for rotation together.

In order to be able even further to improve the flow around the various friction surface arrangements and therefore also the action of removing heat, it is proposed that the first friction surface arrangement or/and the second friction surface arrangement has a fluid passage channel arrangement to enable fluid to pass through when the frictional interaction is produced. As already mentioned, provision may be made in the clutch arrangement according to the invention for the first conveying element to form a pump impeller of a fluid clutch arrangement and for the second conveying element to form a turbine wheel of a fluid clutch arrangement.

According to a further aspect of the present invention, the object mentioned at the beginning is achieved by a clutch arrangement, in particular for a motor vehicle, comprising: a fluid clutch arrangement in a housing arrangement which is filled or can be filled with fluid, comprising a pump impeller, which can be rotated with the housing arrangement, and a turbine wheel, which can be rotated with a driving element, it being possible, by causing fluid to circulate between the pump impeller and the turbine wheel, to produce a torque transmission interaction between the housing arrangement and the output element, and a friction clutch arrangement comprising a first friction surface arrangement, which can be rotated with the housing arrangement, and a second friction surface arrangement, which can be rotated with the output element, which can be brought to rest against each other in order to produce a frictional interaction, the circulation of fluid which can be produced between the pump impeller and the turbine wheel causing flow around at least some areas of the first friction surface arrangement and the second friction surface arrangement.

Merging the functionalities of the fluid clutch arrangement, on the one hand, and the friction clutch arrangement, on the other hand, gives rise to an overall clutch arrangement which relieves the load on the friction clutch arrangement by introducing a fluid clutch arrangement at the same time. This relieving of load takes place, firstly, by the fact that a certain part of the driving torque is also transmitted by the circulation of fluid between the pump impeller and the turbine wheel, and takes place, secondly, by the fact that heat is removed to an increased extent from the region of the friction clutch arrangement by the Circulation of fluid, and therefore the friction clutch arrangement can, in principle, be subjected to a greater load.

In the clutch arrangement according to the invention, a pressing element may, for example, be provided which divides an interior of the housing arrangement into a first space region and a second space region, the first friction surface arrangement and the second friction surface arrangement being arranged essentially in the first space region, and it being possible for a fluid pressure in the second space region to be changed in order to produce the frictional interaction between the first friction surface arrangement and the second friction surface arrangement by means of the pressing element.

Furthermore, provision is made for a fluid exchange flow arrangement to be provided to supply fluid to the first space region and to remove fluid from the first space region. The heated fluid which is drawn off from the housing arrangement can be brought again to ambient temperature or to a significantly reduced temperature in an external cooling arrangement, for example a transmission cooler, before being fed again into the housing arrangement.

Furthermore, provision is preferably made in the clutch arrangement according to the invention for the fluid pressure in the second space region to be able to be changed independently of the fluid exchange in the first space region.

DETAILED DESCRIPTION OF THE PRESENTLY PREFERRED EMBODIMENT

Figure 1:
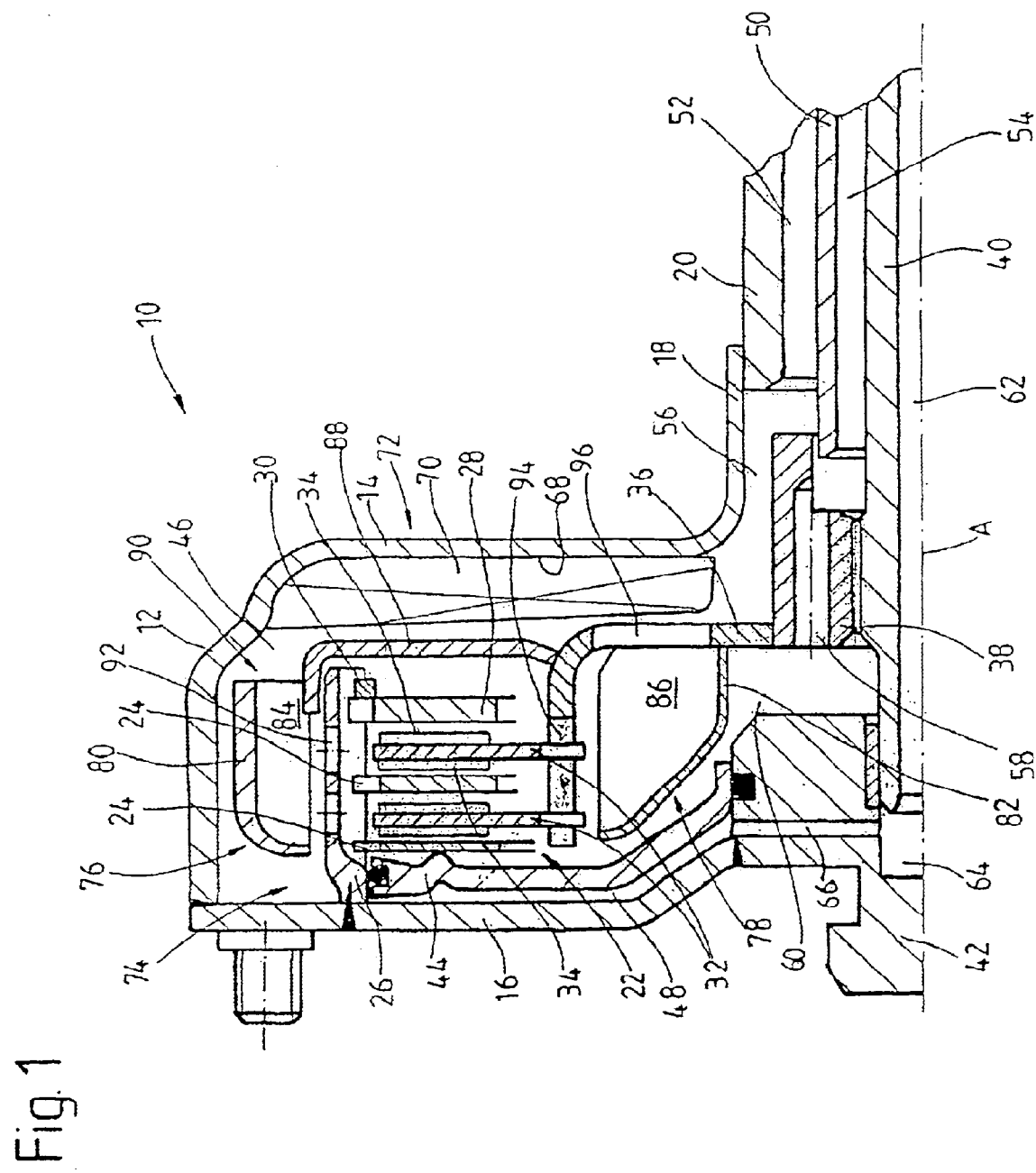
FIG. 1 shows a view of a partial longitudinal section of a first embodiment of a clutch arrangement according to the invention.

In FIG. 1, a clutch arrangement 10 includes a housing arrangement with a cup-shaped shell part 14 and a housing cover 16 connected radially on the outside to it. In a manner similar to "hydrodynamic torque converters", this housing arrangement 12 can be coupled via a flexiplate or the like to a drive shaft of an output assembly, i.e., for example, crankshaft, for rotation together. In a radially inner region, the shell part 14 has a hub region 18 to which a pump drive shaft 20, which is designated as a hollow shaft, is attached.

The clutch arrangement 10 according to the invention has a friction clutch arrangement 22 in the housing arrangement 12. This friction clutch arrangement 22 comprises a plurality of outer disks 24 which provide respective friction surfaces and are attached via a coupling element 26, for example of ring-like design, to the housing arrangement 12 for rotation together, but, by means of corresponding toothing arrangements, can be displaced with respect to the coupling element 26 and therefore also with respect to the housing arrangement 12 in the direction of an axis of rotation A. Furthermore, a ring-like abutment plate 28 is connected in a rotationally fixed manner to this coupling element 26, the axial movement of said abutment plate being prevented at least in one direction by means of a securing ring 30. Furthermore, the friction clutch arrangement 22 has a plurality of inner disks 32. Each of the inner disks 32 bears a friction lining 34 on both of its axial sides, it being possible for the friction linings 34 to be brought into mutual frictional contact with an outer disk situated opposite it in each case or else with the abutment ring 28. The inner disks 32 are coupled in a rotationally fixed manner by means of a ring-like coupling element 36 to an output hub 38 which, in turn, is coupled or can be coupled, for example via an axial toothing to an output shaft 40, for example a transmission input shaft, for rotation together. In this case, the shaft 40 runs coaxially with the pump drive shaft 20, which is designed as a hollow shaft.

A clutch piston 44, which is of ring-like design, extends between a housing hub 42 and the ring-like coupling element 26 which is attached to the housing cover 16, said clutch piston being sealed in a fluid-tight manner by a respective sealing ring or the like both with respect to the housing hub 42 and with respect to the coupling element 26. The clutch piston 44 can be displaced axially with respect to the housing arrangement 12. This clutch piston 44 basically divides the interior of the housing arrangement 12 into two space regions 46, 48. The components of the friction clutch arrangement 22, i.e. the outer disks 24 and the inner disks 32 and the coupling elements 26, 36, 38 coupling these disks 24, 32 to the housing arrangement 12 and to the output shaft 40, are essentially located in the space region 46.

Situated between the pump drive shaft 20 and the output shaft 40 is a further hollow shaft 50 which divides the space region present between the pump drive shaft 20 and the output shaft 40 into two ring-like fluid flow space regions 52, 54. The space region 52 leads via a space region 56, which is formed between the hub 18 and the output shaft 38, directly into the first space region 46 in the housing arrangement 12. The space region 54 leads via respective passage openings 58, which are formed in the output shaft 38, and a space region 60, which is formed between the housing hub 42 and the output shaft 38 or the coupling element 36, likewise into the first space region 46 in the housing arrangement 12. It should be emphasized that, for example, the hollow shaft 50 can be coupled in a rotationally fixed and fluid-tight manner to the output shaft 58, or else can also be sealed off in a fluid-tight manner with respect to the output hub 38 by means of a rotary seal, but otherwise can be held in a not necessarily rotatable manner with said output hub.

A central opening 62 is provided in the output shaft 40 and leads into a space region 64 between the axial end of the drive shaft 40 and the housing hub 42. This space region 64 is connected via at least one fluid channel 66 to the second space region 48 in the housing arrangement 12 for fluid exchange.

Thus, while a fluid pump, which is provided, for example, in a transmission arrangement and is driven by the pump drive shaft 20, can be used to introduce fluid into the space region 46 and to conduct fluid out of the space region 46 via the two space regions 52, 54, in order to keep a fluid exchange flow ready, fluid may be introduced, independently of this fluid exchange flow via the central opening 62, into the second space region 48 in the housing arrangement 12 in order to increase the fluid pressure there with respect to the fluid pressure present in the first space region 46. The clutch piston 44 then presses against the disks 24, 32 and brings the latter into mutual frictional contact. This produces a torque transmission path from the housing arrangement 12 to the output shaft 40.

In order, when this torque transmission connection is produced, in particular in the case of a heavy frictional loading of the surface area regions of the disks 24, 32, which regions come frictionally into interaction with one another, to be able to remove the frictional heat which is produced, the fluid exchange flow which has been discussed is maintained, in which case, for example, the fluid is introduced via the space region 54 and drawn off via the space region 52. In order to provide an improved cooling effect with the friction clutch arrangement 22 particularly in the event of temporary, heavy loads, such as, for example, a sharp acceleration when starting up or when starting up on a hill, since the cooling effect provided by the exchange of fluid is comparatively slow, according to the present invention a circulation of fluid which is combined with the fluid exchange flow is built up within the housing arrangement 12. For this purpose, a plurality of conveying blades 70 are arranged following one another in the circumferential direction on the shell part 14, on its inner surface area 68 which faces the friction clutch arrangement 22. This shell part 14 therefore ultimately forms with these blades 70 a pump impeller which is referred to in general by 72. A further blade wheel, namely a turbine wheel, which is referred to in general by 74, is connected fixedly to the output shaft 40. This turbine wheel 74 has a radially outer turbine wheel region 76 and a radially inner turbine wheel region 78. Each of these turbine wheel regions has a ring-like shell section 80 and 82 which in turn bear respective conveying blades or conveying blade sections 84 and 86. This turbine wheel 74 and the respective shell sections 80, 82 thereof, too, are essentially designed with a cup-like structure and on their side which faces the pump impeller 72 are open toward this pump impeller 72.

The radially outer turbine wheel region 76 is connected via a ring-like carrier 88 to the coupling element 36, which is coupled to the output shaft 40 for rotation together. The radially inner turbine wheel regions 78 or the shell section 82 thereof is attached directly to the coupling element 36.

It can furthermore be seen in FIG. 1 that the two turbine wheel regions 76, 78 are arranged radially outside or radially within the friction clutch arrangement 22 and essentially cover the entire axial region of extent thereof. The functioning principle of the clutch arrangement 10 according to the invention, which thus comprises a friction clutch arrangement 22 and ultimately also a fluid clutch arrangement 90, essentially comprising the pump impeller 72 and the turbine wheel 74, will be described below.

If a torque is to be transmitted via this clutch arrangement 10, then, as already described previously, fluid is introduced under pressure into the second space region 48 in the housing arrangement 12. In the process, the clutch piston 44 presses against the disks 24, 32 which are brought into mutual frictional interaction with a reduction in the slip which is initially still present. In this state, there is therefore a difference in rotational speed, which is considerable in part, between the housing arrangement 12 and the output shaft 40. This difference in rotational speed then also exists between the pump impeller 72 and the turbine wheel 74. As a consequence, the pump impeller 72 conveys fluid which is contained in the first space region 46 in the housing arrangement 12 radially outward where it is deflected axially by the curved configuration of the shell part 14 and flows to the outer turbine wheel region 76. This region 76 conveys the fluid further, deflects the flow path radially inward and conveys it ultimately to the coupling element 26. The latter has, as can be seen in FIG. 1, a plurality of passage openings 92, so that the fluid can now flow radially from the outside to the disks 24 and 32 which are or come frictionally into interaction with one another. In order further to facilitate or improve the flow around or through the friction clutch arrangement 22, lining grooves may, for example, be provided in the friction linings 34, i.e. groove-like hollows which are provided in the surface area regions of the friction linings 34 which enable the fluid to pass from radially on the outside to radially on the inside even when the frictional contact has been produced. The fluid flowing along these lining grooves then flows further radially inward in the direction of that section of the coupling element 36 which essentially extends axially. This section comprises a plurality of coupling projections for the rotational coupling to the inner disks 32, but also has a plurality of cutouts 94 which permit the fluid to pass radially inward.

This fluid then flows further as far as the radially inner turbine wheel region 78 and is deflected axially by the latter and conducted to the radially inner region of the pump impeller 72 and of the conveying blades 70 thereof. In order to make this possible, a plurality of passage openings 96 are likewise provided in the essentially radially extending section of the coupling element 36. The coupling element 36 is dimensioned to transmit the maximum torque which is to be transmitted without the risk of damage, but otherwise the passage regions 94, 96 obstruct as little as possible the circulation of fluid, which arises in the housing arrangement when there is a difference in speed.

The effect achieved by the circulation of fluid, which, according to the present invention, is present in addition to the fluid exchange flow and circulates in the housing arrangement 12, is that the working fluid, which is present in the first space region 46 and the exchange of which can only take place comparatively slowly, repeatedly flows around the friction clutch arrangement 20, particularly in a state in which there is a comparatively large slip in said arrangement. In this case, the heat storage capacity of this fluid is used which, after flowing around the friction clutch arrangement 22 once, as is known from the prior art, has not yet reached the limits of its heat absorption capability. This additional circulation of fluid is especially advantageous when very large loads temporarily occur, since then significantly more heat can be stored and can be removed from the region of the friction clutch arrangement 22 in the fluid, which is fed into the housing arrangement 12 and is also drawn off again from the latter, than in the case in which the fluid, after being fed into the housing arrangement, only flows once along the friction clutch arrangement and then leaves the housing arrangement again. The design according to the invention with a triple-line system enables the exchange of the fluid present in the housing arrangement 12 to be carried out independently of the fluid pressure which is required for engagement of the friction clutch arrangement 22, the embodiments which have been illustrated and described here with the three shafts 20, 52, 40 situated coaxially with respect to one another resulting in a very effective construction which can be produced in a simple manner. As already discussed, it is advantageous to design the passage openings, which permits the circulation of fluid, in the two coupling elements 26 and 36 to be as large as possible in order to minimize the flow resistance, in which case, of course, the mechanical stability which is required has to be taken into consideration. The geometry and the number of lining grooves provided in the friction linings 34 should be selected in such a manner that, firstly, the desired torque can be transmitted, but that, secondly, the drag is also as small as possible and also the volume passed through is as large as possible.

Figure 2:
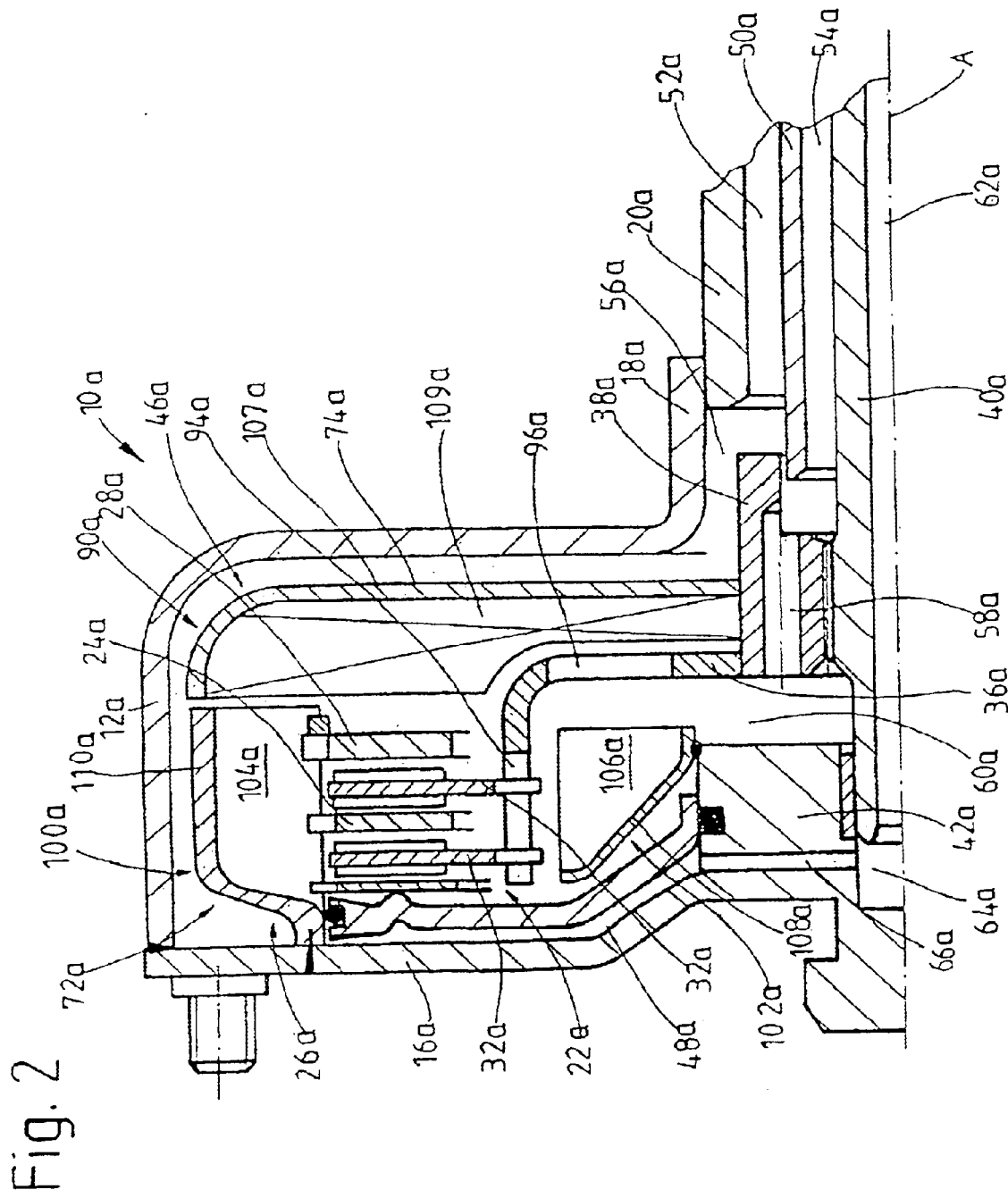
FIG. 2 shows a view corresponding to FIG. 1 of a second embodiment according to the invention.

FIG. 2 illustrates a modified type of design of the clutch arrangement according to the invention. Components which correspond to previously described components in respect of construction and function are referred to by the same reference numbers with the addition of the supplement "a". In the following text, only the differences over the embodiment according to FIG. 1 and which are relevant to the invention will be discussed.

In the clutch arrangement 10a which is illustrated in FIG. 2, the pump impeller 72a, which is coupled to the housing arrangement 12a for rotation together, is now formed with a radially outer pump impeller region 100a and a radially inner pump impeller region 102a which bear the respective conveying blade sections 104a and 106a. This pump impeller 72a, which has two radially staggered regions 100a, 102a, is also axially open on its side which faces the turbine wheel 74a, which is now connected to the output shaft 40 via the output hub 38a for rotation together. The turbine wheel 74a has a shell 107a which is radially continuous and axially curved in the outer region and the conveying blades 109a are provided on the side of the shell which faces the pump impeller 72a. The shell 107a is then attached in its radially inner region to the output shaft 38a, for example by being welded on. It can furthermore be seen that the blades 109a with their axially free edge extend very close to the coupling element 36a in the radially inner region in order to obtain as good conveying efficiency as possible here. A direction of circulation is obtained here which is reversed with respect to the previously described embodiment, i.e. the flow passes through the friction clutch arrangement 22a from radially on the inside to radially on the outside. The inner disks 32a are also coupled again here in a rotationally fixed manner via the coupling element 36a, which has the passage openings or passage regions 94a and 96a, to the output hub 38a and therefore to the output shaft 40a. The radially inner pump impeller region 102a is attached by its shell section 108a to the housing hub 42a by welding, for example. The shell section 110a of the radially outer pump impeller region 100a is attached to the housing cover 16a likewise by welding, for example.

In the embodiment according to FIG. 2, it can furthermore be seen that the outer disks 24a and also the abutment ring 28a with their projections or toothings provided in each case radially on the outside are in engagement with the radially inner end regions of the blade sections 104a and are therefore coupled via these blade sections 104a and the shell section 110a which carries them to the housing arrangement 12a for rotation together, although they can also be displaced axially with respect to the housing arrangement 12a. The radially outer pump impeller region 100a with its blade sections 104a therefore ultimately forms here the coupling element 26a, which attaches the outer disks 24a and the abutment ring 28a to the housing arrangement 12a.

In the embodiment illustrated in FIG. 2 too, the fluid exchange flow which is undertaken via the space regions 52a and 54a is therefore combined with a circulation of fluid in the interior of the housing arrangement 12a. During this circulation of fluid, the fluid flows at a significantly higher flow rate than in the case of the fluid exchange flow, with the result that, as already described previously with regard to FIG. 1, significantly more heat can be removed from the region of the friction clutch arrangement 22a. The heated fluid which is drawn off from the housing arrangement 12a and from the first space region 46a thereof can then be cooled in a transmission cooler or the like and subsequently fed again into the housing arrangement 12a.

It should be emphasized that in both embodiments the friction clutch arrangement is relieved of load, firstly, by the fact that it can be cooled better, in particular in the state in which there is a large amount of slip causing a severe load, and, secondly, is relieved of load by the fact that some of the torque can additionally be transmitted via the fluid clutch arrangement, which comprises the pump impeller and the turbine wheel. However, the essential aspect of the fluid clutch arrangement and of the various blade or conveying wheels thereof is the cooling or the improved cooling of the friction clutch arrangement by causing fluid to circulate in the housing arrangement. As already mentioned at the beginning, this circulation of fluid is combined with the fluid exchange flow, with the result that ultimately some of the circulating fluid is continuously replaced by new fluid flowing into the housing arrangement.

In both embodiments, the lining grooving provided in the friction linings ensures an improved flow around or through the friction clutch arrangement, in which case the required minimization of the drag can be ensured here, for example, by configuring the friction linings to an appropriate thickness or configuring the groove-like fluid passage channels to be appropriately deep.

It should also be emphasized that, of course, particularly in the region of the friction clutch arrangement a very wide variety of configurations can be selected which may, for example, have more or fewer disks than the disks which have been illustrated. It is of importance that, according to the principles of the present invention, the friction clutch arrangement or the frictionally effective regions thereof are at least partially situated in a region which is detected by the circulation of fluid built up in the housing arrangement, and is therefore passed through.

What is claimed is:

1. A fluid clutch arrangement comprising:
   a housing which can be rotated about an axis of rotation and having an interior which can be filled with fluid;
   an output element which can be rotated about said axis of rotation relative to said housing;
   a first friction surface arrangement and a second friction surface arrangement which can be brought into frictional engagement with each other, wherein said first friction surface arrangement is coupled to said housing for rotation together and said second friction surface arrangement is coupled to said output element for rotation together;
   means for producing a fluid exchange flow wherein fluid is continuously introduced into said interior and removed from said interior; and
   a fluid circulation arrangement in said housing for causing fluid to circulate around at least some parts of said first and second friction surface arrangements without requiring a fluid exchange flow at the same time, said fluid circulation arrangement comprising:
   a first fluid conveying element which can be rotated with said housing; and
   a second fluid conveying element which can be rotated together with said output element.

2. A fluid clutch arrangement as in claim 1 wherein said first conveying element is a first blade wheel which is coaxial with said axis, and said second conveying element is a second blade wheel which is coaxial with said axis.

3. A clutch arrangement as in claim 2 wherein said first blade wheel comprises a first blade wheel shell having a plurality of circumferentially arranged first conveying blades, and said second blade wheel comprises a second blade wheel shell having a plurality of circumferentially arranged second conveying blades, said first and second conveying blades being open toward each other.

4. A clutch arrangement as in claim 2 wherein at least one of said first and second blade wheels comprises a radially outer blade wheel region and a radially inner blade wheel region, said first and second friction surface regions being arranged radially between said radially outer blade wheel region and said radially inner blade wheel region.

5. A clutch arrangement as in claim 1 wherein each said friction surface arrangement comprises at least one friction element, said at least one friction element of at least one of said first and second friction surface arrangements being coupled to a respective at least one of said housing and said output element by a respective at least one of said first and second conveying elements for rotation together.

6. A clutch arrangement as in claim 3 wherein each said friction surface arrangement comprises at least one friction element, said at least one friction element of at least one of said first and second friction surface arrangements being coupled to a respective at least one of said housing and said output element by the conveying blades of a respective at least one of said first and second conveying elements for rotation together.

7. A clutch arrangement as in claim 1 wherein at least one of said first and second friction surface arrangements has a fluid passage channel arrangement for passing fluid during said frictional engagement.

8. A clutch arrangement as in claim 1 wherein said first fluid conveying element comprises a pump impeller and said second fluid conveying element comprises a turbine wheel.

9. A fluid clutch arrangement comprising:
   a housing which can be rotated about an axis of rotation and having an interior which can be filled with fluid;
   an output element which can be rotated about said axis of rotation relative to said housing;
   a first friction surface arrangement which can be rotated with the housing and a second friction surface arrangement which can be rotated with the output shaft;
   a pressing element which divides said interior into a first space region and a second space region, said first and second friction surface arrangements being essentially arranged in the first space region, said pressing element being responsive to fluid pressure in said second space region to bring said first and second surface arrangements into frictional engagement;
   a pump impeller which can be rotated with the housing; and
   a turbine wheel which can be rotated with the output element to transmit torque between the housing and the output element by means of a fluid in said interior and to produce a circulation of fluid around at least some parts of said first and second friction surface arrangements.

10. A fluid clutch arrangement as in claim 9 further comprising a fluid exchange arrangement for supplying fluid to said first space region and removing fluid from said first space region.

11. A fluid clutch arrangement as in claim 10 further comprising means for varying fluid pressure in the second space region independently of fluid exchange in the first space region.

* * * * *